(12) United States Patent
Sekine et al.

(10) Patent No.: US 7,944,780 B2
(45) Date of Patent: May 17, 2011

(54) MAGNETIC RECORDING DEVICE AND MAGNETIC RECORDING HEAD DRIVE MECHANISM HAVING A MAGNETIC APPLYING SECTION OF A SPECIFIC LENGTH

(75) Inventors: Koujirou Sekine, Ibaraki (JP); Hiroshi Hatano, Takatsuki (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 43 days.

(21) Appl. No.: 12/517,292

(22) PCT Filed: Oct. 26, 2007

(86) PCT No.: PCT/JP2007/070904
§ 371 (c)(1),
(2), (4) Date: Jun. 2, 2009

(87) PCT Pub. No.: WO2008/068973
PCT Pub. Date: Jun. 12, 2008

(65) Prior Publication Data
US 2010/0073803 A1    Mar. 25, 2010

(30) Foreign Application Priority Data
Dec. 7, 2006 (JP) .................................. 2006-330430

(51) Int. Cl.
*G11B 11/00* (2006.01)
(52) U.S. Cl. ..................... 369/13.13; 369/13.33; 360/59
(58) Field of Classification Search ............... 369/13.13, 369/13.33, 13.32, 13.17, 112.09, 112.14, 369/112.21, 112.27; 360/59; 385/129, 31, 88–91; 250/201.3
See application file for complete search history.

(56) References Cited

U.S. PATENT DOCUMENTS

| | | | | |
|---|---|---|---|---|
| 6,636,460 | B2 * | 10/2003 | Akiyama et al. | 369/13.14 |
| 6,741,524 | B2 * | 5/2004 | Ichihara et al. | 369/13.01 |
| 6,952,380 | B2 * | 10/2005 | Isshiki et al. | 369/13.33 |
| 7,054,234 | B2 * | 5/2006 | Saga et al. | 369/13.33 |
| 2001/0040868 | A1 | 11/2001 | Ueyanagi et al. | 369/300 |
| 2009/0015959 | A1 * | 1/2009 | Nakamura | 360/59 |

FOREIGN PATENT DOCUMENTS

| | | |
|---|---|---|
| JP | 1-112505 A | 5/1989 |
| JP | 4-48406 A | 2/1992 |
| JP | 2001-319365 A | 11/2001 |
| JP | 2001-319387 A | 11/2001 |
| JP | 2002-50012 A | 2/2002 |
| JP | 2004-134051 A | 4/2004 |
| WO | WO 2008/068973 A1 | 6/2008 |

* cited by examiner

Primary Examiner — Tan X Dinh
(74) Attorney, Agent, or Firm — Sidley Austin LLP

(57) ABSTRACT

Provided is a magnetic recording device which can perform high density magnetic recording by simple constitution. The magnetic recording device is provided with a disk driving device for rotating a magnetic disk; a head having a heating section for heating a circular track of the magnetic disk and a recording element for applying a magnetic field modulated by an electric signal to the magnetic disk; and a head drive device for circularly moving the head in the radius direction of the magnetic disk by rotating about a driving shaft. The recording element has a magnetism applying section that traverses any track heated by the heating section in the radius direction of the magnetic disk.

14 Claims, 6 Drawing Sheets

MAGNETIC RECORDING DEVICE AND MAGNETIC RECORDING HEAD DRIVE MECHANISM HAVING A MAGNETIC APPLYING SECTION OF A SPECIFIC LENGTH

RELATED APPLICATIONS

This application is a National Stage of International Application No. PCT/JP2007/070904, filed with the Japanese Patent Office on Oct. 26, 2007, which is based on Japanese Patent Application No. 2006-330430.

FIELD OF THE INVENTION

The present invention relates to a magnetic recording device and magnetic recording head.

BACKGROUND OF THE INVENTION

In the magnetic recording method, a magnetic bit is seriously affected by the external temperature and other factors as the recording density is increased. This requires use of a recording medium having a high coercive force. However, use of such a recording medium increases the magnetic field required for recording. The upper limit of the magnetic field generated by a recording head is determined by the saturated magnetic flux density. The value thereof is already close to the limit of each material, and a drastic increase in this value cannot be expected. In one of the techniques proposed to solve this problem, magnetic weakening is caused by local heating at the time of recording, and recording is performed when the coercive force is reduced. After that, heating is suspended and natural cooling is started, whereby the stability of the recorded magnetic bit is ensured. This method is known under the name of the thermally assisted magnetic recording method.

However, in this recording method, part of a magnetic disk is heated using a heating section, and the coercive force in this region is reduced. A magnetic pattern is formed in the region with reduced coercive force using a recording element. A series of these operations is performed to reduce the required generation magnetic field of the recording element. Further, subsequent to the recording operation, the disk temperature is reduced back to the room temperature, and therefore, even a small magnetic pattern is less subjected to thermal agitation. A stable recording pattern is maintained for a long time. Achievement of this advantage is what is intended by this thermal assisted magnetic recording method, wherein a magnetic pattern is formed in the region of the magnetic field generated by the recording element.

However, in a magnetic recording device using this thermally assisted magnetic recording head, when the thermally assisted magnetic recording head is moved along an arc in the radial direction of the magnetic disk, there will be a change in the angle between the track recorded by the recording element, and the head. Then the heating section located far away forwardly of the recording element may heat a different track. In such a case, the track wherein the recording element passes by is not heated, and a magnetic pattern cannot be formed correctly on the magnetic disk.

To solve such a problem, for example, a laser beam used for heating is applied from the direction as viewed obliquely from the region of the generated magnetic field, so as to bring the heated region closer to the region of generated magnetic field (Patent Document 1). In another method having been proposed, a laser beam for heating is applied from the position closest to the head wherever possible, using a waveguide (Patent Document 2).

According to the method disclosed in Patent Document 1, however, if the distance between the head and magnetic disk is reduced to ensure high-density magnetic recording, the effect of applying a laser beam in a slanting direction will be reduced, and the position immediately below the recording element cannot be heated. According to the method disclosed in Patent Document 2, if the size of the recording element is reduced to ensure high-density magnetic recording, the formation of the waveguide will be very difficult.

In still another method, an offset mechanism is provided to move the region heated by the heating section, across the width of the slider relative to the recording element, thereby overcoming the disadvantage of the heating section being located separately from the recording element, and ensuring high-density recording (Patent Document 3). The Patent Document 3 also discloses the method of providing a plurality of recording elements and heating sections, wherein one of the recording elements or one of the heating sections is selected as appropriate so that the region heated by the recording element and heating section will be moved relatively across the width of the head slider.

Patent Document 1: Japanese Unexamined Patent Application Publication No. 2001-319387
Patent Document 2: Japanese Unexamined Patent Application Publication No. 2002-50012
Patent Document 3: Japanese Unexamined Patent Application Publication No. 2004-134051

DISCLOSURE OF INVENTION

Problems to be Solved by the Invention

In the method of using an offset mechanism as disclosed in the Patent Document 3, however, the heating section is moved in the axial direction of the head. This requires a high-precision drive device. Mounting of such a drive device on a very small head is difficult. Further, complicated control circuits and control procedures are required to ensure high-precision drive of the heating section as the head moves on the disk. Further, the Patent Document 3 discloses a method of installing a plurality of recording elements and heating sections, wherein one of the recording elements or one of the heating sections is selected as appropriate. This requires a great number of parts to be mounted on a very small head, and complicated control circuits and control procedures to be used.

In view of the prior art problems described above, it is an object of the present invention to provide a magnetic recording device capable of performing a high-precision magnetic recording.

Means for Solving the Problems

To solve the aforementioned problems, the present invention is characterized by the following Structures:

1. A magnetic recording device including:
   a disk driving device for rotating a magnetic disk;
   a head provided with a heating section for heating the circular track of this magnetic disk, and a recording element for applying the magnetic field modulated by electric signals to this magnetic disk; and
   a head drive device for moving the head along an arc in the radial direction of the magnetic disk by rotating about a drive shaft;

the aforementioned magnetic recording device being further characterized in that, in any of the tracks to be recorded in the radial direction of the magnetic disk, the recording element contains a magnetic applying section of a length capable of applying magnetism to the track heated by the heating section.

2. The magnetic recording device described in the Structure 1 wherein the length G of the magnetic applying section satisfies the Formula (A), when:

"d1" denotes the distance between the point wherein the line segment connecting between the center of the aforementioned heating section and the rotating center of the drive shaft crosses the aforementioned magnetic applying section, and the center of the heating section;

"θ1" indicates an angle formed by the line segment L1 connecting between the center of the heating section and the rotating center of the drive shaft in the outermost peripheral track, and the tangential S1 of the outermost peripheral track heated by the heating section; and "θ2" represents an angle formed by the line segment L3 connecting between the center of the heating section and the rotating center of the drive shaft in the track of the innermost periphery, and the tangential S2 of the innermost periphery of the track heated by the heating section.

$$G > d1 \times \tan|\theta1| + d1 \times \tan|\theta2| \tag{A}$$

3. The magnetic recording device described in the Structure 1 wherein the aforementioned magnetic applying section is shaped as a circular arc formed about the center of the heating section.

4. The magnetic recording device described in any one of the aforementioned Structures 1 through 3 wherein the heating section heats the track by irradiation with light.

5. The magnetic recording device described in the aforementioned Structure 4 wherein the head is provided with an optical fiber that leads the light from a light source to the head.

6. The magnetic recording device described in the Structure 4 wherein the heating section has a plasmon probe for generating near field light and irradiating the aforementioned track.

7. The magnetic recording device described in any one of the aforementioned Structures 1 through 3 wherein the aforementioned head includes a reproduction element for reading the magnetic information recorded on the magnetic disk.

8. A magnetic recording head drive mechanism including:

a head including a heating section for heating the circular track of a rotating magnetic disk, and a recording element for applying the magnetic field modulated by electric signals to this magnetic disk; and a head drive device for moving the head along an arc in the radial direction of the magnetic disk by rotating about a drive shaft;

wherein, in any of the tracks to be recorded in the radial direction of the magnetic disk, the recording element contains a magnetic applying section of a length capable of applying magnetism to the track heated by the heating section.

9. The magnetic recording head drive mechanism described in the Structure 8 wherein the length G of the magnetic applying section satisfies the Formula (A), when:

"d1" denotes the distance between the point wherein the line segment connecting between the center of the aforementioned heating section and the rotating center of the drive shaft crosses the aforementioned magnetic applying section, and the center of the heating section;

"θ1" indicates an angle formed by the line segment L1 connecting between the center of the heating section and the rotating center of the drive shaft in the outermost peripheral track, and the tangential S1 of the outermost peripheral track heated by the heating section; and "θ2" represents an angle formed by the line segment L3 connecting between the center of the heating section and the rotating center of the drive shaft in the track of the innermost periphery, and the tangential S2 of the innermost periphery of the track heated by the heating section.

$$G > d1 \times \tan|\theta1| + d1 \times \tan|\theta2| \tag{A}$$

10. The magnetic recording head drive mechanism described in the Structure 8 wherein the aforementioned magnetic applying section is shaped as a circular arc formed about the center of the heating section.

11. The magnetic recording head drive mechanism described in any one of the aforementioned Structures 8 through 10 wherein the heating section heats the track by irradiation with light.

12. The magnetic recording head described in the aforementioned Structure 11 wherein the head is provided with an optical fiber that leads the light from a light source to the head.

13. The magnetic recording head drive mechanism described in the Structure 11 wherein the heating section has a plasmon probe for generating near field light and irradiating the aforementioned track.

14. The magnetic recording head drive mechanism described in any one of the aforementioned Structures 8 through 10 wherein the aforementioned head includes a reproduction element for reading the magnetic information recorded on the magnetic disk.

Effects of the Invention

According to the present invention, when recording on any of the tracks in the radial direction of the magnetic disk, the magnetic applying section traverses the track heated by the heating section. This structure, being a simple structure, ensures high-density magnetic recording, without being affected by the displacement between the heating section and recording element caused when the head is moved along an arc in the radial direction of the magnetic disk.

DESCRIPTION OF REFERENCE NUMERALS

Figure 1:
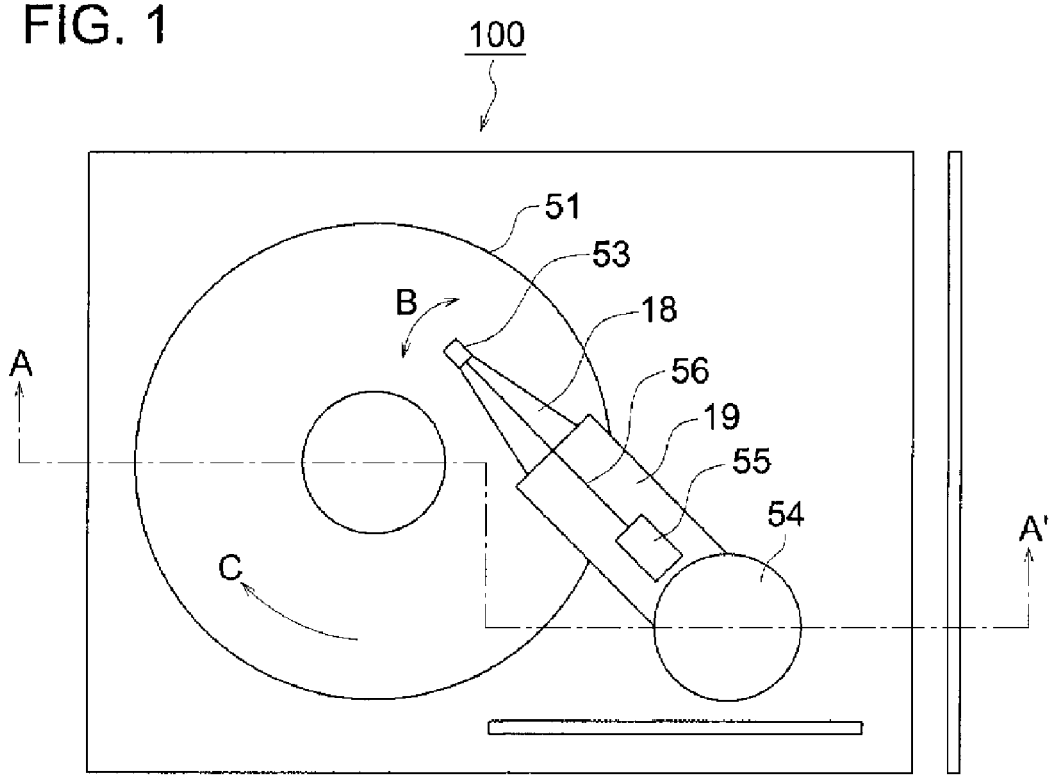
FIG. 1 is an explanatory diagram showing an example of the configuration of a magnetic recording device of the present invention.

18 Suspension section
19 Arm
21 Light emitting outlet
51 Magnetic disk
52 Spindle
53 Head
54 Drive shaft
55 Light source
56 Optical fiber
80 Motor
100 Magnetic recording device
102 Heating section
103 Recording element
104 Reproduction element
108 Plasmon probe
120 Magnetic applying section
121 Core
123 Coil

BEST MODE FOR CARRYING OUT THE INVENTION

The following describes the embodiments of the present invention with reference to drawings:

[Schematic Configuration of Magnetic Recording Device 100]

Figure 2:
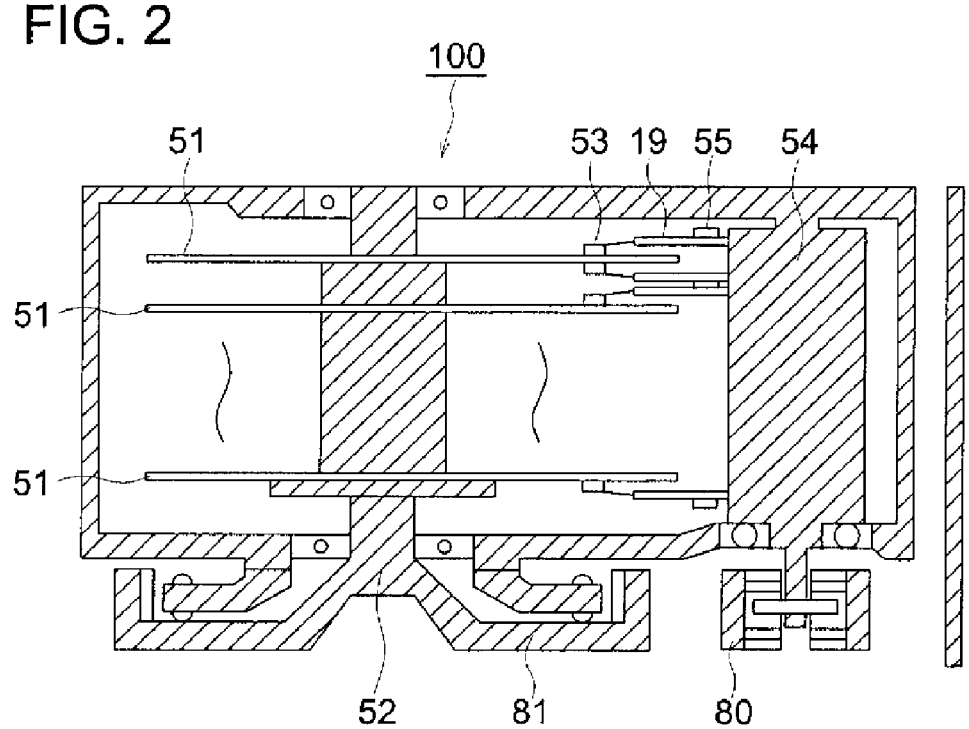
FIG. 2 is a cross sectional view showing the magnetic recording device of the present invention.

FIGS. 1 and 2 show the schematic configuration of the magnetic recording device 100 in an embodiment of the present invention. FIG. 1 represents the upper side of the magnetic recording device 100, while FIG. 2 shows the cross section taken along arrow line A-A'.

The magnetic recording device 100 includes a magnetic disk 51, head 53 for recording and reproducing information, drive shaft 54 and light source 55. As shown in FIG. 1, the head 53 is supported by the suspension section 18 of the arm 19, and the arm 19 is mounted on the drive shaft 54. When the magnetic disk 51 is stopped, the head 53 is biased downward by the suspension section 18, and therefore, the bottom surface of the head 53 is kept in contact with the magnetic disk 51. When the magnetic disk 51 starts to rotate in the direction shown by arrow C, the head 53 is levitated at a very small clearance of about 2 nm through 30 nm by the air flow generated on the bottom surface, whereby the distance from the magnetic film of the magnetic disk 51 is maintained constant.

The light source 55 is the laser light source of a semiconducting laser element and others. The laser beam emitted from the light source 55 is led to the head 53 by an optical fiber 56.

FIG. 2 is an example of the cross sectional view of the magnetic recording device 100 for recording and production using both sides of a plurality of magnetic disks 51. The magnetic disk 51 is mounted on the spindle 52, which is driven by a motor 81. The arm 19 of each head 53 used for recording and reproductions on both sides of each of the magnetic disks 51 is mounted on the drive shaft 54, which is driven by a motor 80.

A controller (not illustrated) reads out the servo pattern recorded on the magnetic disk 51, using the reproduction element 104 mounted on the magnetic disk 51, and detects the position of the head 53 on the magnetic disk 51, based on the servo signal having been read out. Based on the result of position detection, the controller drives the motor 80 and rotates the drive shaft 54, so that each head 53 is moved along an arc in the radial direction of the magnetic disk 51, as shown in the arrow B of FIG. 1, and is stopped at a predetermined track position.

The magnetic recording device 100 for recording and reproduction using both sides of a plurality of the magnetic disks 51 has been described with reference to FIG. 2. Without being restricted a plurality of the magnetic disks 51, the present invention is applicable to the case of recording and reproduction using one side of one magnetic disk 51.

(Head Overview)

Figure 3:
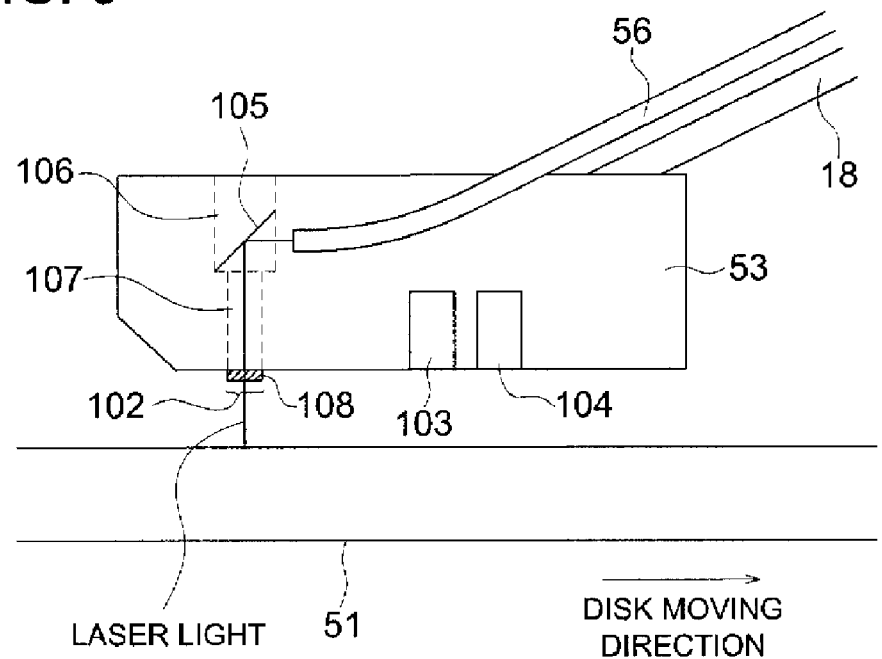
FIG. 3 is a schematic configuration diagram representing an example of the head of the present invention.

FIG. 3 shows an example of the schematic configuration of the head 53.

The head 53 is supported by the suspension section 18 of the arm 19. The head 53 is provided with a recording element 103 and reproduction element 104. The head 53 is also provided with a hole 106, and a prism 105 is accommodated on the bottom surface of the hole 106. The lower portion of the prism 105 is equipped with an optical waveguide 107. The optical waveguide 107 is formed to have a diameter of about 200 nm, and a plasmon probe 108 is installed on the light emitting end face of the bottom surface of the head 53.

The plasmon probe 108 is a triangular tabular metallic thin film (made of aluminum, gold, silver and others), for example, and is equipped with an antenna having an apex P with a radius of 20 nm or less. When light acts on the plasmon probe 108, near field light is formed in the vicinity of the apex P. It is known to permit recording or reproduction to be performed using the light with a very small spot size. In this embodiment, a plasmon probe 108 is installed at the light emitting position of the optical waveguide, whereby a local plasmon is generated, and the size of the light spot formed in the optical waveguide is reduced to about 30 nm. In the present embodiment, the apex P of the plasmon probe 108 is assumed to be located at the center of the optical waveguide 107, and the portion of the plasmon probe 108 is called the heating section 102.

Further, an optical fiber 56 is embedded in the head 53. The light emitting end of the optical fiber 56 is arranged in the head 53 in such a way that the laser beam emitted from the optical fiber 56 will enter the prism 105. The optical fiber normally used has a diameter of about 50 through 250 μm.

When information is recorded, a laser beam is applied to the prism 105 through the optical fiber 56. The laser beam having been refracted or reflected is guided by the optical waveguide 107, and the diameter of the laser beam is reduced to about 0.05 μm. Further, the size of the optical spot is reduced to about 30 nm by the plasmon probe 108. In this manner, the light goes through the center of the heating section 102, and is applied to the magnetic disk 51, whereby a predetermined minute region is heated.

The laser beam is applied to the magnetic disk 51 through the heating section 102, whereby the minute region on the rotating magnetic disk 51 is heated. At the same time, the recording element 103 allows a magnetic field to be applied to the minute region having been heated. The circular magnetic section to be recorded on the rotating magnetic disk 51 by the magnetic field applied in this manner is called the track.

An example using the prism 105 has been described with reference to FIG. 3. The optical element is not restricted to the prism 105 alone. A mirror or lens can be used as the optical element. Further, without using an optical element, it is possible to use a head 53 wherein the light guided by the optical fiber is applied to the magnetic disk 51 through the plasmon probe 108.

Figure 4:
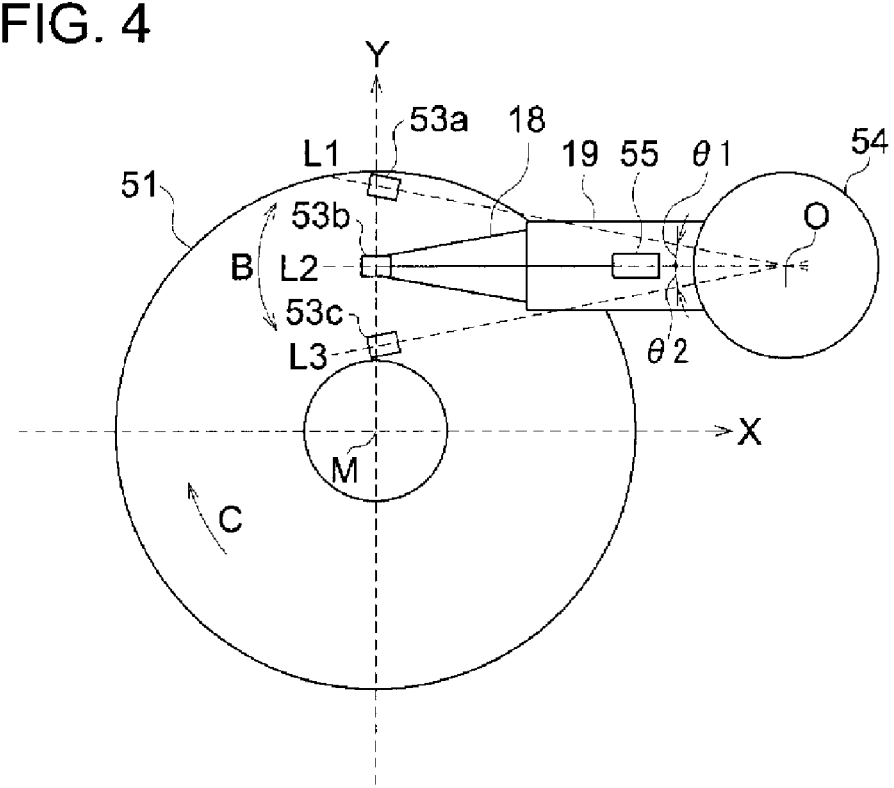
FIG. 4 is an explanatory diagram representing the scope of a head 53 moving along an arc in the radial direction of a magnetic disk 51 in the magnetic recording device 100 of the present invention.

FIG. 4 is an explanatory diagram representing the scope of a head 53 moving along an arc in the radial direction of a magnetic disk 51 in the magnetic recording device 100 of the present invention.

The same functional elements as those described so far will be assigned with the same numerals of reference, and will not be described to avoid duplication.

The reference numeral 53a in the drawing indicates the position of the head 53a at the time of recording on the track in the outermost periphery of the magnetic disk 51. The reference numeral 53c shows the position of the head 53c at the time of recording on the innermost periphery of the magnetic disk 51. The arm 19 of the heads 53a and 53c, suspension section 18 and others are not illustrated. The reference numeral 53b indicates the position of the head 53b at the time of recording on the track located intermediate between the outermost and innermost peripheries.

"M" denotes the rotating center of the magnetic disk 51. The X axis indicates the line segment passing through "M" and parallel to L2, while the Y axis represents the line segment perpendicular to the X axis. The arrow-marked directions of the X and Y axes are positive.

"L1" is a line segment connecting between the center of the heating section 102 (not illustrated in FIG. 4) provided on the head 53a, and the rotating center O of the drive shaft 54. "L2" is a line segment connecting between the center of the heating section 102 (not illustrated in FIG. 4) provided on the head 53b, and the rotating center O of the drive shaft 54. "L3" is a line segment connecting between the center of the heating section 102 (not illustrated in FIG. 4) provided on the head 53c, and the rotating center O of the drive shaft 54. "θ1" indicates an angle between the L1 and L2. "θ2" indicates an angle between the L2 and L3. If the line segment L2 is parallel with the X axis, and the L2 is a reference, the head 53 rotates about "O" by θ1 in the outermost peripheral direction, and by θ2 in the innermost peripheral direction.

As described above, when having moved in the outermost peripheral direction, the head 53 is tilted by θ1 with respect to the X axis. When having moved in the innermost peripheral direction, the head 53 is tilted by θ2 with respect to the X axis.

Figure 5A:
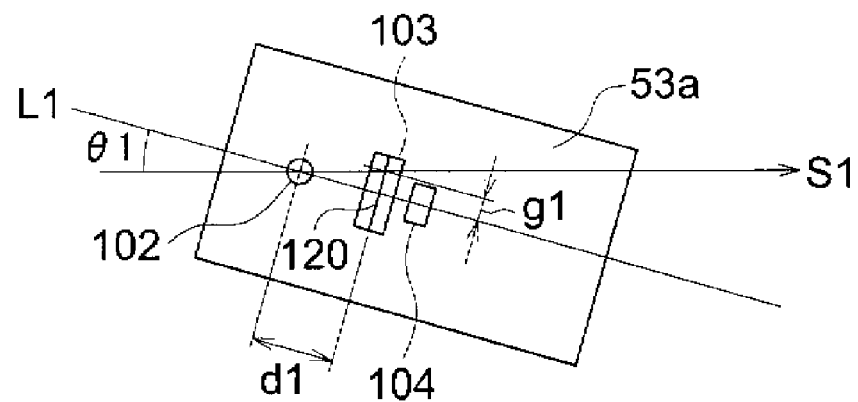
FIGS. 5a, 5b and 5c are plan views respectively representing the heads 53a, 53b and 53c in the first embodiment of the present invention at each track position explained with reference to FIG. 4, as viewed from the same side as that of FIG. 4.
Figure 5B:
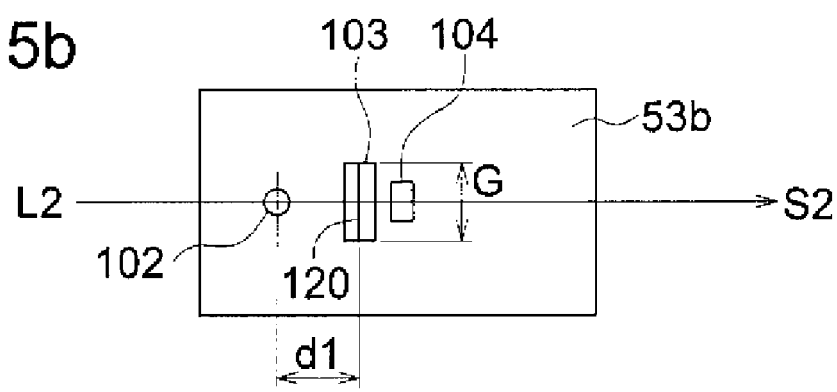
Figure 5C:
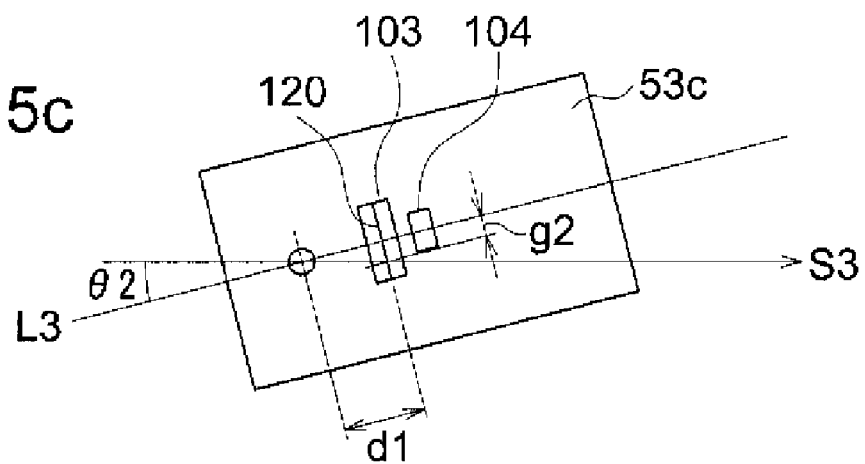

The following describes the head 53 and recording element 103 in the first embodiment of the present invention with reference to FIGS. 5a, 5b and 5c and FIGS. 6a and 6b. FIGS. 5a, 5b and 5c are plan views respectively representing the heads 53a, 53b and 53c in the first embodiment at each track position explained with reference to FIG. 4, as viewed from the same side as that of FIG. 4. For the sake of explanation, FIGS. 5a, 5b and 5c show a heating section 102, recording element 103 and reproduction element 104 provided on the side of the head 53 opposed to the magnetic disk 51.

Figure 6A:
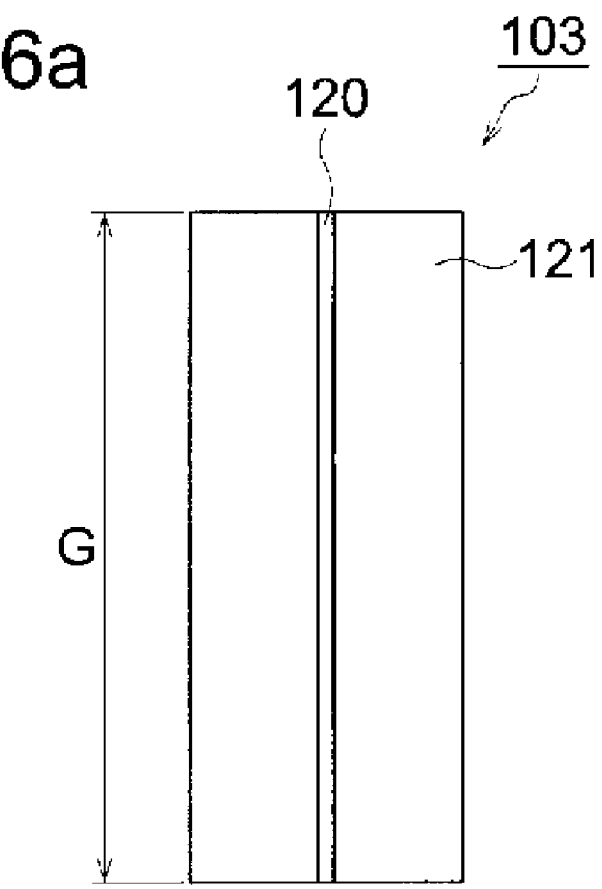
FIGS. 6a and 6b are diagrams explaining an example of the configuration of a recording element 103 in the first embodiment.
Figure 6B:
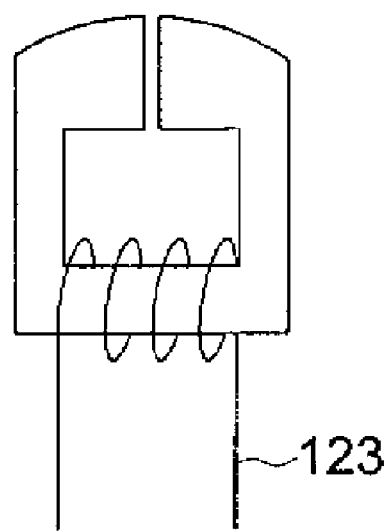

FIGS. 6a and 6b are diagrams explaining an example of the configuration of a recording element 103 in the first embodiment. In the first place, the configuration of the recording element 103 will be described with reference to FIGS. 6a and 6b. FIG. 6a is a plan view of the recording element 103 as viewed from the side of the magnetic disk 51, and FIG. 6b is the cross sectional view thereof.

The recording element 103 is a commonly used magnetic head. A core 121 made of a magnetic material is wound with a coil 123 to form this recording element 103. When an electric signal is applied to the coil 123, the magnetic field is generated by the magnetic applying section 120, and a magnetic pattern is recorded on the magnetic disk 51. "G" indicates the length of the magnetic applying section 120. The magnetic field is formed within this range.

The following describes the head 53b at the time of recording on the track at the reference position located intermediate between the outermost and innermost peripheries. As described above, laser beam is applied to the medium through the heating section 102 to heat the minute region of the magnetic disk 51. At the same time, the recording element 103 applies magnetic field to the minute region having been heated, whereby recording is performed. The minute region having been heated is subjected to magnetic weakening by heating, and coercive force is reduced. This allows magnetic recording to be performed by the magnetic field formed by the recording element 103. In the meantime, the non-heated region has a high degree of coercive force, and recording cannot be performed by application of magnetic field.

As described above, the recording element 103 applies magnetic field to the magnetic disk 51 within the range defined by the length G of the magnetic applying section 120. In this case, the length G of the magnetic applying section 120 is not directly equivalent to the region of recording on the magnetic disk 51, but the width of the heated region is the width of the magnetic track for recording.

The "d1" of FIG. 5 denotes the distance between the point wherein the line segment connecting between the center of the heating section 102 and the rotating center O of the drive shaft 54 crosses the magnetic applying section 120, and the center of the heating section. The line segment indicated by the arrow S2 in FIG. 5b is the tangent at the central portion of the track wherein the heated minute region on the magnetic disk 51 moves. In the vicinity of the heated region, the tangential S2 lies in the positive X axis direction, and agrees with the line segment L2.

FIG. 5a shows that the head 53 is rotated by θ1 from the reference position in the outermost peripheral direction to reach the track on the outermost periphery. The line segment indicated by the arrow S1 denotes the tangential on the outermost periphery of the track wherein the heated minute region on the magnetic disk 51 moves. In the vicinity of the heated minute region, the tangential S1 lies in the positive X axis direction. The line segment L1 is tilted by θ1 with reference to the tangential S1. To put it another way, θ1 is the angle formed by the L1 connecting between the center of the heating section 102 and rotating center O of the drive shaft 54, and the tangential S1 on the outermost periphery of the track heated by the heating section 102.

As described above, magnetic recording can be made only when the magnetic field is applied to the heated minute region. The magnetic applying section 120 must have at least the length of traversing the tangential S1 wherein the heated minute region moves. The length g1 of the magnetic applying section 120 required when the head 53 has moved to the track on the outermost periphery must satisfy the following Formula (1):

$$g1 > d1 \times \tan|\theta 1| \qquad (1)$$

As shown in FIG. 5c, the case is the same when the head 53 is moved by θ2 in the direction of the innermost periphery from the reference position. "θ2" represents an angle formed by the line segment L3 connecting between the center of the heating section 102 and the rotating center of the drive shaft 54, and the tangential S3 of the innermost periphery of the track heated by the heating section. Since the tangential S3 is tilted by θ2 with respect to the line segment L3, the length g2 of the magnetic applying section 120 required when the head 53 moves by θ2 in the direction of the innermost periphery is required to satisfy the Formula (2):

$$g2 > d1 \times \tan|\theta 2| \qquad (2)$$

As described above, the length G of the magnetic applying section 120 capable of recording can be obtained from Formula (3) both on the innermost and outermost peripheries.

$$G > g1+g2 = d1 \times \tan|\theta1| + d1 \times \tan|\theta2| \quad (3)$$

For example, assume that "d1" is 1 μm, and |θ1|=|θ2|=10°. This requires the recording element 103 wherein the length G of the magnetic applying section 120 is greater than 0.353 μm.

As the length G of the magnetic applying section 120, the loss of the generated magnetic field is increased. Accordingly, the length is preferably shorter than the space between tracks As described above, the length G of the magnetic applying section 120 of the recording element 103 is increased to ensure that the recording element 103 is not affected by the displacement of the heating section 102 and recording element 103 caused when the head is moved along an arc in the radial direction of the magnetic disk 51. This arrangement ensures high-density magnetic recording to be performed using a simple structure.

Figure 7A:
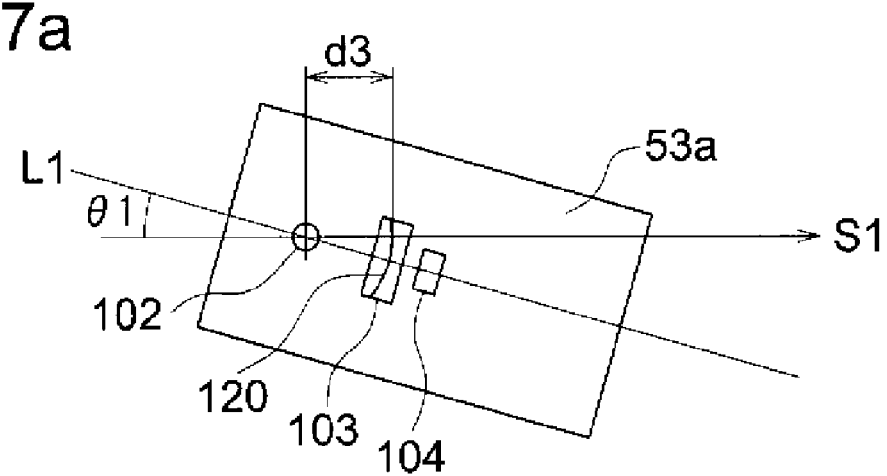
FIGS. 7a, 7b and 7c are plan views representing the heads 53a, 53b and 53c in the second embodiment of the present invention at each track position explained with reference to FIG. 4, as viewed from the same side as that of FIG. 4.
Figure 7B:
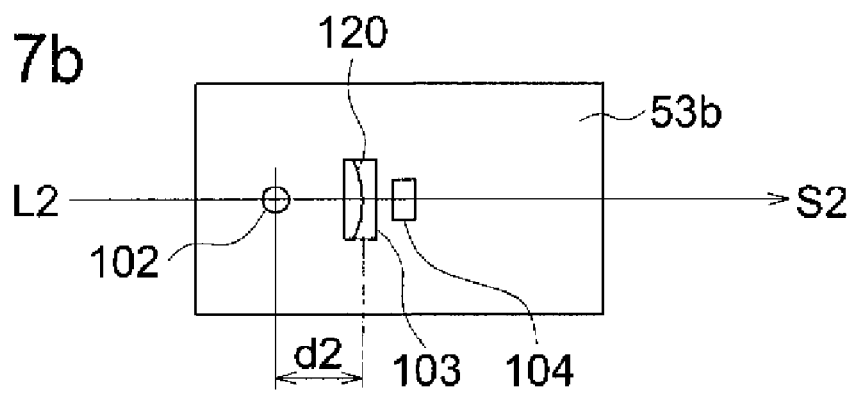
Figure 7C:
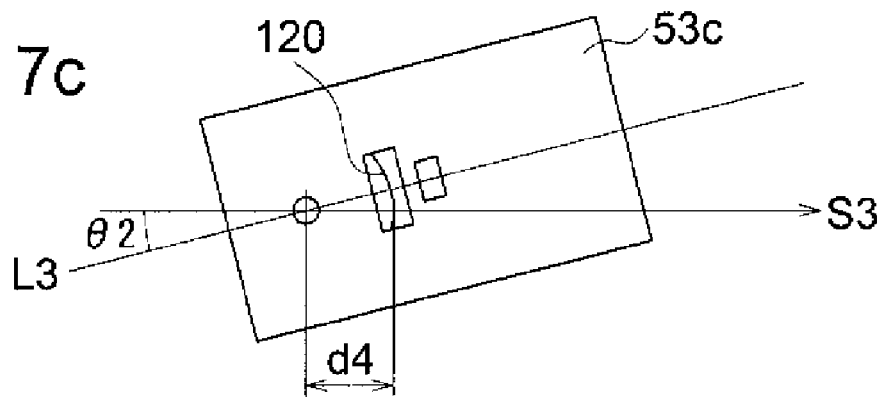
Figure 8:
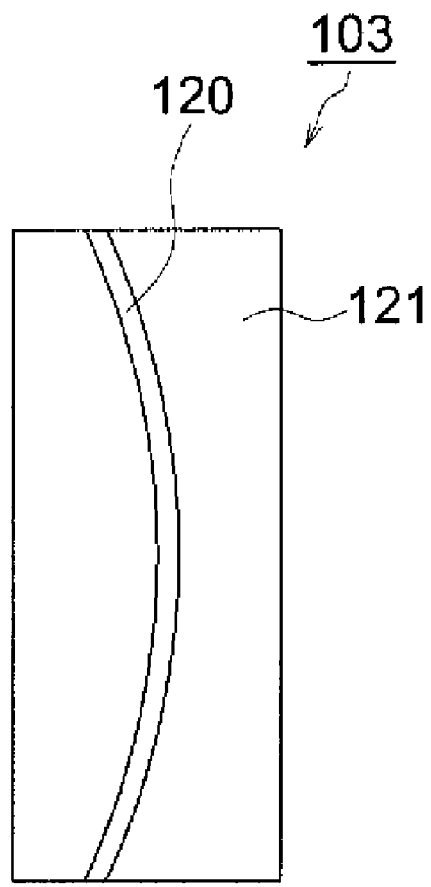
FIG. 8 is a diagram explaining an example of the configuration of a recording element 103 in the second embodiment.

Referring to FIGS. 7a, 7b, 7c and 8, the following describes the head 53 and recording element 103 in the second embodiment of the present invention. FIGS. 7a, 7b and 7c are plan views respectively representing the heads 53a, 53b and 53c in the second embodiment of the present invention at each track position explained with reference to FIG. 4, as viewed from the same side as that of FIG. 4. For the sake of explanation, FIGS. 7a, 7b and 7c show the heating section 102, recording element 103 and reproduction element 104 provided on the surface opposed to the magnetic disk 51 of the head 53. FIG. 8 is a diagram explaining the magnetic applying section 120 of the recording element 103 in the second embodiment. It is a plan view of the head 53 as observed from the side of the magnetic disk 51.

In the first place, referring to FIG. 8, the configuration of the recording element 103 will be described. The recording element 103 of this embodiment is different from that of the first embodiment in that the magnetic applying section 120 is formed in a circular arc about the center of the heating section 102. The cross section of the recording element 103 is the same as the recording element 103 described with reference to FIGS. 6a and 6b. A core 121 made of a magnetic material is wound with a coil 123 to form this recording element 103.

FIG. 7b refers to the case of recording on the track intermediate between the innermost and outermost peripheries. In the same manner as FIG. 5b, the heated minute region is recorded. The line segment indicated by the arrow S2 in FIG. 7b denotes the tangential wherein the heated minute region on the magnetic disk 51 moves. In the vicinity of the minute region, the tangential S2 lies in the positive X axis direction, and agrees with the line segment L2. The "d1" of FIGS. 5a, 5b and 5c is assumed to denote the distance between the point wherein the line segment connecting between the center of the heating section 102 and the rotating center O of the drive shaft 54 crosses the magnetic applying section 120, and the center of the heating section.

As shown in FIG. 7a, on the track of the outermost periphery, the tangential S1 on the outermost periphery of the track wherein the heated minute region on the magnetic disk 51 shown by the arrow S1 moves is tilted by θ1 with respect to the line segment L1. Thus, in FIG. 7a, the portion wherein magnetic field is applied to the heated minute region corresponds to the upper portion of the magnetic applying section 120. "d3" is assumed to denote the distance between the center of the heated region in this case, and the crossing point wherein the magnetic applying section 120 traverses the tangential S2.

As shown in FIG. 7c, when the head 53 is rotated by θ2 about the track of the innermost periphery, the tangential S3 wherein the heated minute region on the magnetic disk 51 indicated by the arrow S3 moves is tilted by θ2 with respect to the line segment L3. Thus, in FIG. 7c, the portion wherein magnetic field is applied to the heated minute region corresponds to the lower portion of the magnetic applying section 120. "d4" is assumed to denote the distance between the center of the heated region in this case, and the crossing point wherein the magnetic applying section 120 traverses the tangential S2.

In this embodiment, the magnetic applying section 120 of the recording element 103 mounted on the head 53 is formed in a circular arc and the center of the heating section 102 is located equidistant from any position, to put it another way, d2=d3=d4. The time between heating by laser beam through the heating section 102 and application of magnetic field from the magnetic applying section 120 is constant, regardless of the position on the magnetic disk 51 to which the head 53 is moved. This ensures that the temperature of the heated minute region on the magnetic disk 51 when magnetic field is applied is constant, and magnetic recording is performed under stable conditions.

The read-out operation is performed separately from the write-in operation. The reproduction element 104 related to the read-out operation is not subjected any restriction on the relative position with the heating section 102 and recording element 103.

As described above, the present invention provides a magnetic recording device designed in a simple structure that ensures high-density magnetic recording.

The invention claimed is:

1. A magnetic recording device including:
   a disk driving device for rotating a magnetic disk;
   a head provided with a heating section for heating a circular track of the magnetic disk, and a recording element for applying a magnetic field modulated by electric signals to the magnetic disk; and
   a head drive device for moving the head along an arc in a radial direction of the magnetic disk by rotating about a drive shaft;
   wherein, in any of tracks to be recorded in the magnetic disk, the recording element contains a magnetic applying section of a length G configured to apply magnetism to the track heated by the heating section,
   wherein the length G of the magnetic applying section satisfies a Formula (A), when:
   "d1" denotes a distance between a point wherein a line segment connecting between a center of the heating section and a rotating center of the drive shaft crosses the magnetic applying section, and the center of the heating section;
   "θ1" indicates an angle formed by a line segment L1 connecting between the center of the heating section and the rotating center of the drive shaft in an outermost peripheral track, and the tangential S1 of the outermost peripheral track heated by the heating section; and
   "θ2" represents an angle formed by a line segment L3 connecting between the center of the heating section and the rotating center of the drive shaft in the track of the innermost periphery, and the tangential S3 of the innermost periphery of the track heated by the heating section, $$G > d1 \times \tan|\theta1| + d1 \times \tan|\theta2| \quad (A).$$

2. The magnetic recording device described in claim 1,
wherein the magnetic applying section is shaped as a circular arc formed about the center of the heating section,
wherein, when "d2" denotes a distance between a point wherein a line segment L2 connecting between a center of the heating section and a rotating center of the drive shaft crosses the magnetic applying section having the circular arc, and the center of the heating section and a tangential S2 of a case of recording a track intermediate between the innermost and the outermost agrees with the line segment L2, the distance "d2" is assumed to be equivalent to the distance "d1" and the length G of the magnetic applying section satisfies the Formula (A) by substituting "d1" with "d2."

3. The magnetic recording device described in claim 1, wherein the heating section heats the track by irradiation with light.

4. The magnetic recording device described in claim 3 wherein the head is provided with an optical fiber that leads the light from a light source to the head.

5. The magnetic recording device described in claim 3 wherein the heating section has a plasmon probe for generating near field light and irradiating the track.

6. The magnetic recording device described in claim 1 wherein the head includes a reproduction element for reading the magnetic information recorded on the magnetic disk.

7. A magnetic recording head drive mechanism including:
a head including a heating section for heating a circular track of a rotating magnetic disk, and a recording element for applying the magnetic field modulated by electric signals to the magnetic disk; and
a head drive device for moving the head along an arc in a radial direction of the magnetic disk by rotating about a drive shaft;
wherein, in any of tracks to be recorded in the magnetic disk, the recording element contains a magnetic applying section of a length G configured to apply magnetism to the track heated by the heating section,
wherein the length G of the magnetic applying section satisfies a Formula (A), when:
"d1" denotes a distance between a point wherein a line segment connecting between a center of the heating section and a rotating center of the drive shaft crosses the magnetic applying section, and the center of the heating section;
"θ1" indicates an angle formed by a line segment L1 connecting between the center of the heating section and the rotating center of the drive shaft in an outermost peripheral track, and the tangential S1 of the outermost peripheral track heated by the heating section; and
"θ2" represents an angle formed by a line segment L3 connecting between the center of the heating section and the rotating center of the drive shaft in the track of the innermost periphery, and the tangential S3 of the innermost periphery of the track heated by the heating section, $$G > d1 \times \tan|\theta 1| + d1 \times \tan|\theta 2| \qquad (A).$$

8. The magnetic recording head drive mechanism described in claim 7,
wherein the magnetic applying section is shaped as a circular arc formed about the center of the heating section,
wherein, when "d2" denotes a distance between a point wherein a line segment L2 connecting between a center of the heating section and a rotating center of the drive shaft crosses the magnetic applying section having the circular arc, and the center of the heating section and a tangential S2 of a case of recording a track intermediate between the innermost and the outermost agrees with the line segment L2, the distance "d2" is assumed to be equivalent to the distance "d1" and the length G of the magnetic applying section satisfies the Formula (A) by substituting "d1" with "d2."

9. The magnetic recording head drive mechanism described in claim 7 wherein the heating section heats the track by irradiation with light.

10. The magnetic recording head drive mechanism described in claim 9 wherein the head is provided with an optical fiber that leads the light from a light source to the head.

11. The magnetic recording head drive mechanism described in claim 9 wherein the heating section has a plasmon probe for generating near field light and irradiating the track.

12. The magnetic recording head drive mechanism described in claim 7 wherein the head includes a reproduction element for reading the magnetic information recorded on the magnetic disk.

13. The magnetic recording head drive mechanism described in claim 2 wherein, when "d3" denotes a distance between a point where the tangential S1 crosses the magnetic applying section having the circular arc and the center of the heating section, and "d4" denotes a distance between a point where the tangential S3 crosses the magnetic applying section having the circular arc and the center of the heating section, "d2"="d3"="d4" is satisfied.

14. The magnetic recording head drive mechanism described in claim 8 wherein, when "d3" denotes a distance between a point where the tangential S1 crosses the magnetic applying section having the circular arc and the center of the heating section, and "d4" denotes a distance between a point where the tangential S3 crosses the magnetic applying section having the circular arc and the center of the heating section, "d2"="d3"="d4" is satisfied.

* * * * *